United States Patent Office 2,803,986
Patented Aug. 27, 1957

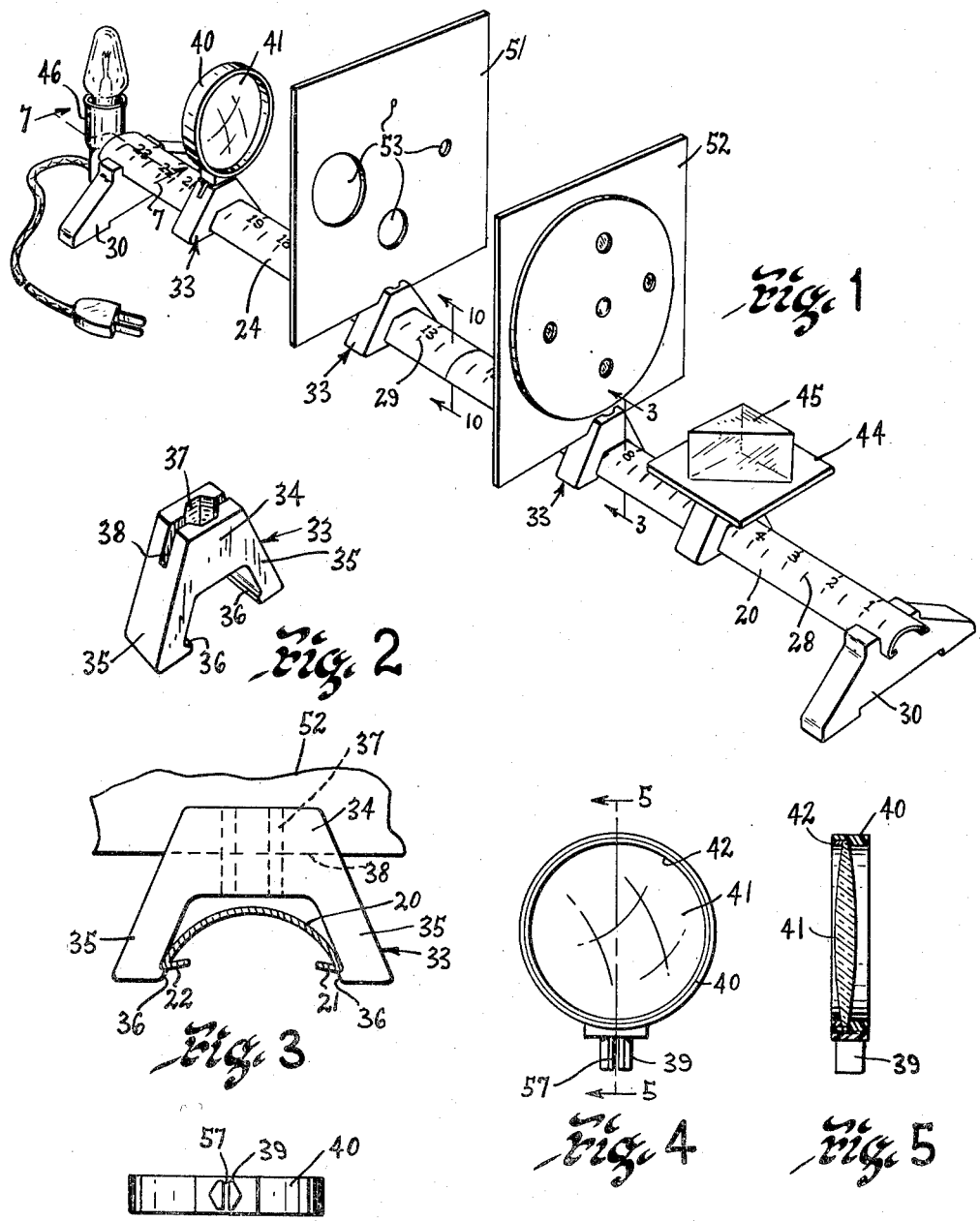
Aug. 27, 1957  J. A. CHOINIERE ET AL  2,803,986
OPTICAL BENCHES
Filed Aug. 25, 1954  2 Sheets-Sheet 1
INVENTORS
JOSEPH ARMAND CHOINIERE
LOUIS PRUNIER
ATTORNEY

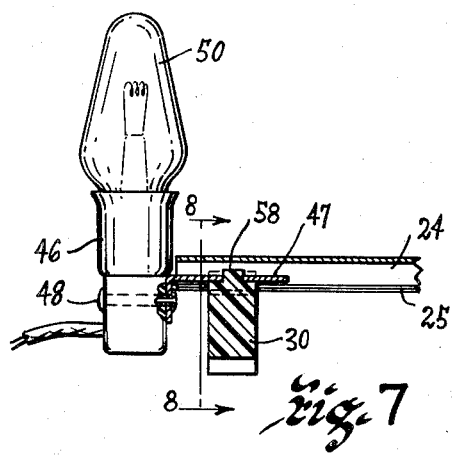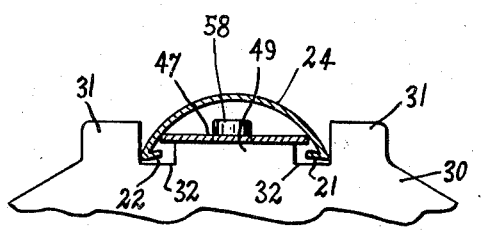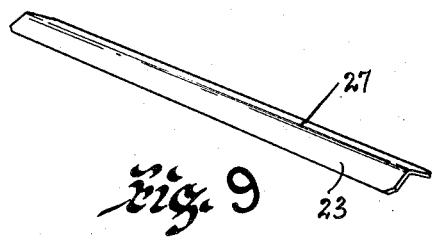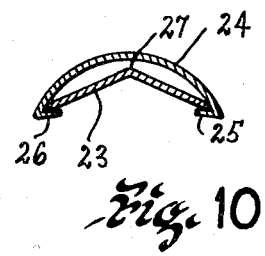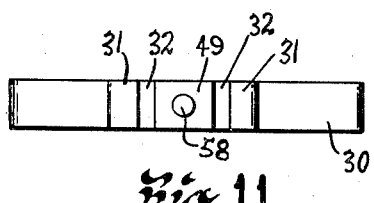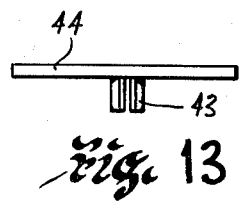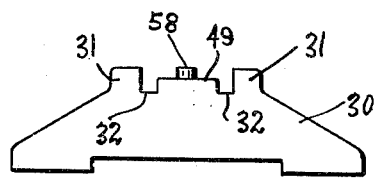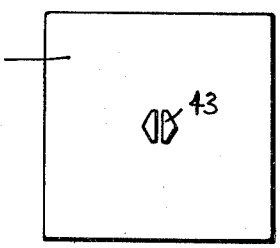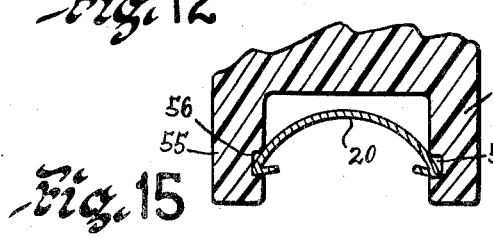

2,803,986

OPTICAL BENCHES

Joseph Armand Choiniere, Webster, and Louis Prunier, Oxford, Mass., assignors to American Optical Company, Southbridge, Mass., a voluntary association of Massachusetts Application August 25, 1954, Serial No. 452,032

8 Claims. (Cl. 88—1)

This invention relates to improvements in optical benches and has particular reference to the provision of an optical bench having improved mounting means therefor and means for supporting optical apparatus thereon.

One of the principal objects of this invention is to provide an optical bench having novel mounting means therefor and embodying further novel means for supporting lenses and/or other optical apparatus for movement longitudinally on the bench.

Another object is to provide an improved optical bench embodying an elongated bed of resilient material formed to an arcuate cross-sectional shape and supporting means therefor comprising at least one standard having a recess therein for reception of the bed, the recess being of slightly shorter length than the normal width of the bed whereby when the bed is positioned in the recess the inherent resiliency thereof will maintain the parts in assembled relation.

Another object is to provide an optical bench embodying a bed of the above character and further embodying at least one separable support having a recess therein adapted to fit over the bed and to be slidably and frictionally held thereon through the inherent resiliency of the bed, each support embodying means in the form of a preshaped recess for removably receiving optical apparatus whereby said optical apparatus may be adjusted to related spacial requirements by relative movement of the supports longitudinally on the bed.

A further object is to provide an optical bench of the above character which embodies novel means for supporting a source of illumination in position for cooperative use with the adjustable optical apparatus carried by the bed.

Other objects and advantages of the invention will become apparent from the following description taken in connection with the accompanying drawings in which:

Fig. 1 is a perspective view of an optical bench embodying the invention;

Fig. 2 is a perspective view of a supporting bracket or carriage used for supporting optical apparatus on the bed of the device;

Fig. 3 is an enlarged vertical sectional view taken substantially on line 3—3 of Fig. 1 and illustrating particularly the method of mounting a bracket on the bed;

Fig. 4 is a front elevational view of a lens and lens holder adapted for use with the present invention;

Fig. 5 is a vertical sectional view taken substantially on line 5—5 of Fig. 4;

Fig. 6 is a bottom plan view of the device shown in Fig. 4;

Fig. 7 is an enlarged horizontal sectional view taken substantially on line 7—7 of Fig. 1 and illustrating particularly the method of mounting a source of illumination on the bed;

Fig. 8 is a vertical sectional view taken substantially on line 8—8 of Fig. 7;

Fig. 9 is a perspective view of a bed connecting member for connecting an extension to the bed of the device;

Fig. 10 is an enlarged vertical sectional view taken substantially on line 10—10 of Fig. 1;

Fig. 11 is an enlarged top plan view of a bed-supporting leg;

Fig. 12 is a front elevational view of the leg shown in Fig. 11;

Fig. 13 is a side elevational view of a prism-supporting table;

Fig. 14 is a bottom plan view of the table shown in Fig. 13; and

Fig. 15 is an enlarged fragmentary sectional view of a portion of a modified supporting bracket.

Referring more particularly to the drawings wherein like characters of reference designate like parts throughout the several views, the optical bench embodying the present invention comprises a bed 20 which is formed of an elongated strip of resilient material such as stainless steel or the like which is formed to an arcuate cross-sectional shape and preferably provided with inwardly turned longitudinally extending lips 21—22 on each side thereof, the lips 21—22 preferably being rolled to prevent the extreme outer longitudinal extremities of the bed from providing sharp edges. The lips 21—22 also tend to prevent undesired twisting or spiralling distortion of the bed and also provide additional rigidity at the edges of the bed.

The lips 21—22 also serve as means for retaining, within the curved area of the bed 20, a resilient connecting strip 23 (Figs. 9 and 10) whereby an extension 24 may be added to increase the over-all length of the bed 20. The extension 24 is preferably formed similar to the bed 20 with longitudinal lips 25—26. The bed 20 and extension 24 may be easily mounted on the connecting strip 23 by sliding the adjacent ends toward each other on the strip 23, the strip 23 being preferably formed of stainless steel or other similar resilient material and bent along a longitudinal axis substantially midway between the side edges thereof so as to form a ridge 27 which, when the strip 23 is assembled with a bed 20 and bed extension 24, will be spaced slightly from the under side thereof as shown in Fig. 10 to allow flexibility and desired tension upon the bed 20 and extension 24 while the parallel side edges thereof engage the inner sides of the bed 20 and extension 24 at the bend formed by the lips 21—22. Thus, in this manner the inherent resiliency of the connecting strip 23 holds the bed 20 and extension 24 in position.

The outer or convex surface of the bed 20 and extension 24 carry cooperating scales 28 and 29 respectively (Fig. 1) whereby various optical elements to be mounted on the bench may be accurately adjusted in desired known spaced relation so that the device may be used to perform various optical tests to be described hereinafter.

The assembled bed 20 and extension 24 are supported by stands 30 at each end. The stands 30 may be formed to any desired contour shape and are preferably formed of a relatively rigid and durable material such as butyrate which may be molded to the desired shape and size. The upper edge of the stands 30 are provided with two spaced projections 31 (Figs. 8, 9 and 11) and with notches 32 therein adjacent the inner sides of the projections 31. The projections are spaced apart a distance slightly smaller than the normal over-all width of the bed 20. The sides of the bed 20 or extension 24, when being assembled with the respective stands 30, are compressed slightly and thus are made to fiit into the notches 32 between the projections 31. This allows the inherent resiliency of the material thereof to urge the opposed edges toward the adjacent sides of the respective projections 31, thus firmly securing the stands 30 in desired assembled relation with the ends of the bed 20 and extension 24.

Brackets or carriages 33 for supporting optical elements on the bench are preferably molded or otherwise formed of a selected material such as butyrate or metallic materials and are provided with a body portion 34 (Figs. 2 and 3) having a pair of integral legs 35 extending therefrom. The legs 35 are preferably angled outwardly and downwardly and the inner surfaces thereof adjacent their ends are provided with lips or shelves 36 which are adapted to be fitted beneath the longitudinal edges of the bed 20 or extension 24. The spacing between the inner sides of the legs 35 adjacent the lips 36 is slightly smaller than the normal over-all width of the bed 20 or extension 24. A bracket 33 can be easily assembled with a bed 20 or extension 24 by forcing it downwardly thereupon until the lips or shelves 36 snap down over the edges, it being found that when using the preferred materials for the bed 20, extension 24 and brackets 33 that the desired resiliency may occur in any one or all the parts and thus a cooperative yieldable function results which permits a bracket 33 to be mounted in an upright position and retained on the bed 20 or extension 24. Each bracket 33 is also slidable longitudinally on the bench and can thus be easily aligned with graduations on the scales 28 and 29.

While the brackets 33 have been described as having legs 35 which are preferably angled outwardly and downwardly, it is conceivable and within the scope of this invention that the brackets may be made with legs 55 (Fig. 15) having the inner surfaces thereof substantially parallel, in which case it would be desirable to provide notches 56 or the like therein for receiving the opposed side edges of the bed 20 or extension 24. In such a case the bed 20 or extension 24 will be held in place in a similar manner to that shown in Fig. 3.

The brackets 33 are each provided with a preshaped vertical opening 37 through the body portion 34 and with a slot 38 extending thereacross, the slots 38 thus extending transversely of the bed 20 or extension 24 when the brackets 33 are assembled therewith.

The slots 38 are adapted to receive the lower edges of devices such as discs, screens or apertured cards such as the cards 51 and 52 which are used in performing optical functions to be later described, and the openings 37 are adapted to receive similarly shaped projections 39 which are provided on the periphery of annular holders 40 (Figs. 4, 5 and 6). The annular holders 40 support lenses 41 by any suitable means such as retainers 42 and the lenses 41 are of any selected optical csaracteristics desired for use with the bench. The projections 39 are preferably slotted as indicated at 57 (Fig. 4) to provide spaced portions having yielding characteristics which enables them to be forced easily into and out of the openings 37 and to be frictionally held in place.

A slotted projection 43 (Figs. 13 and 14) provided on the under side of a table 44 is also shaped to fit into the openings 37. Thus, a prism 45 (Fig. 1) or the like may be positioned on the table 44 for use with the bench.

It is apparent that by shaping the openings 37 and projections 39—43 to irregular comating contour shapes, the brackets 33 are thus able to retain the optical elements, lens holders and table, if desired, in non-rotatable positions.

While the contour shapes of the openings 37 and projections 39—43 may be irregular, as described above, it may be desirable to provide them with cylindrical or conical shapes. In this case the optical elements may be adjusted by rotation around the longitudinal axis of the projections for providing means for performing certain optical tests.

It is also desirable to provide a source of illumination in order to use the bench for certain optical tests, and to accomplish this a lamp socket 46 has a supporting plate 47 secured thereto as by a rivet, screw or the like 48 (Fig. 7). The plate 47 is of a width such as will permit sliding thereof into the end of the extension 24. The plate 47 will thus extend into the space between the extension 24 and the upright portion 49 separating the notches 32 of the stand 30. The upright portion 49 of each stand 30 has thereon a short post or stud 58 (Figs. 7, 8, 11 and 12) which is adapted to extend through an opening in the supporting plate 47 for preventing withdrawal of the plate 47. It is apparent that when using a source of illumination, such as a lamp 50 mounted in the socket 46, that it is necessary to assemble a supporting plate 47 and stand 30 before attaching the stand 30 to the extension 24. By reason of the fact that the extension 24 or bed 20 has its longitudinal edges spaced apart a distance greater than the distance between the inner walls of the projections 31, whereby the resiliency of said portion 24 or 20, as the case may be, will frictionally bind said longitudinal edges thereof with said inner walls and will simultaneously exert a resilient binding pressure on the edges of the plate 47 and thereby frictionally hold it in place on the short post or stud 58 and on the top of the upright portion 49.

In using an optical bench of this type, for example, to demonstrate light travel, a bench is formed first by connecting the extension 24 to the bed 20 through the joining member or strip 23, attaching the front stand 30, and then attaching the source of illumination and securing it in place by the other stand 30. Then two brackets 33 are placed on the bench at the desired places on the scales 28—29 and a card 51 inserted in the slot 37 of one of the brackets 33. Card 51 is provided with various sizes of holes 53. Into the slot 37 of the other bracket 33 is inserted a blank unperforated card or screen and illumination will be directed through a selected hole 53 in card 51 onto the blank card.

By removing the cards and placing a selected convex lens 41 on a bracket 33 and adjusting the lens along the bench, the light can be projected and focused to a remote screen.

The bench can also be used to form experimental light focusing devices, Galilean, astronomical and terrestrial telescopes, microscopes, reflectors, or even periscopes by proper selection and location of lenses, apertures, prisms, light sources and additional mirrors. Such devices can also be used to demonstrate other principles of optics such as the visible spectrum, dispersion, refraction, magnification, etc.

While the objects and advantages of the invention have been accomplished by the provision of a novel optical bench constructed and arranged in accordance with the foregoing description, it is apparent that changes may be made in the details of construction and arrangement of parts shown and described without departing from the spirit of the invention as expressed in the accompanying claims. Therefore, it is to be understood that all matter set forth or shown in the accompanying drawings is to be interpreted as illustrative and not in a limiting sense.

We claim:

1. An optical bench of the character described comprising a bed formed of an elongated strip of resilient material having an arcuate cross-sectional shape and relatively narrow inwardly bent substantially parallel longitudinal sides, a stand for supporting the strip and having a pair of integral projections thereon, said projections being spaced apart a distance slightly less than the normal over-all width of the strip whereby the sides of the strip may be compressed permitting it to be inserted between said projections and the inherent resiliency thereof will urge the sides of the strip against said projections for retaining the strip therebetween, holding devices having spaced depending portions frictionally clamped on the strip for supporting optical elements on said strip and adapted to be moved longitudinally thereof for adjustment of the relative positions of the optical elements carried thereby and to frictionally hold said elements in adjusted position.

2. An optical bench of the character described comprising a bed formed of a plurality of elongated strips of resilient material having arcuate cross-sectional shapes, and relatively narrow edge portions bent to lie inwardly thereof, a joining member fitted in adjacent ends of said elongated strips, stands for supporting the strips and having a pair of projections thereon, said projections of each stand being spaced apart a distance slightly less than the normal over-all width of the strips whereby the sides of the strips may be compressed permitting them to be inserted between said projections and the inherent resiliency thereof will urge the sides of the strips against said projections for retaining the strips therebetween, and a holding member for supporting optical elements on said strips and adapted to move longitudinally thereof, said holding member having projecting portions shaped to straddle and frictionally grip the opposed side edges of said strips and spaced apart a distance slightly less than the normal over-all width of the strips, said holding member being formed of resilient material whereby said projecting portions may be spread apart sufficiently to permit the strips to be inserted therebetween and whereby the inherent resiliency thereof and of said strips will cause the holding member to be yieldably and slidably held on the strips.

3. An optical bench of the character described comprising a bed formed of an elongated strip of resilient metallic material having an arcuate cross-sectional shape, a stand for supporting the elongated strip and having a pair of projections thereon, said projections being spaced apart a distance slightly less than the normal over-all width of the strip whereby the sides of the strip may be compressed permitting it to be inserted between said projections and the inherent resiliency thereof will urge the sides of the strip against said projections for retaining the strip therebetween, holding devices for supporting optical elements on said strip, said holding devices having spaced depending portions shaped to straddle and frictionally engage the side edges of the strip and adapted to be moved longitudinally thereof for adjustment of the relative positions of the optical elements carried thereby and to frictionally retain said positions of adjustment, and projection means removably extended within an end of said strip and having a portion thereof connected with said stand for supporting a source of illumination in substantial alignment with said optical elements carried by said holding devices.

4. An optical bench of the character described comprising a bed formed of an elongated strip of resilient material having an arcuate cross-sectional shape, a stand for supporting the strip and having a pair of projections thereon, said projections being spaced apart a distance slightly less than the normal over-all width of the strip whereby the sides of the strip may be compressed permitting it to be inserted between said projections and the inherent resiliency thereof will urge the sides of the strip against said projections for retaining the strip therebetween, holding devices for supporting optical elements on said strip, said holding devices having portions shaped to straddle and frictionally engage the sides of the strip and adapted to be moved longitudinally thereof for adjustment of the relative positions of the optical elements carried thereby, and means having a portion removably mounted on said strip and connected with said stand for supporting a source of illumination in substantial alignment with said optical elements carried by said holding devices, said means comprising a supporting bracket shaped to be inserted within the curve of one end of the strip between the strip and stand and having a portion shaped to interfit with a portion of the stand.

5. An optical bench of the character described comprising a bed formed of an elongated strip of resilient material having an arcuate cross-sectional shape, stands for supporting the strip and having a pair of upwardly extending projections thereon, said projections of each stand being spaced apart a distance slightly less than the normal over-all width of the strip whereby the sides of the strip may be compressed permitting it to be inserted between said projections and the inherent resiliency thereof will urge the sides of the strip against said projections for retaining the strip therebetween, a holding member for supporting optical elements on said strip and adapted to move longitudinally thereof, said holding member having depending projecting portions shaped to grip the opposed side edges of said bed and spaced apart a distance slightly less than the normal over-all width of the strip, said holding member being formed of resilient material whereby said projecting portions may be spread apart sufficiently to permit the strip to be inserted therebetween and whereby the inherent resiliency thereof and the resiliency of the strip will cause the holding member to be yieldably and slidably held on the strip, and means removably mounted on said strip and having a portion connected with said stand for supporting a source of illumination in substantial alignment with said optical elements supported by the holding member.

6. An optical bench of the character described comprising a bed formed of an elongated strip of resilient material having an arcuate cross-sectional shape, stands for supporting the elongated strip and having a pair of projections thereon, said projections of each stand being spaced apart a distance slightly less than the normal over-all width of the strip whereby the sides of the strip may be compressed permitting it to be inserted between said projections and the inherent resiliency thereof will urge the sides of the strip against said projections for retaining the strip therebetween, a holding member for supporting optical elements on said strip and adapted to move longitudinally thereof, said holding member having projecting portions shaped to grip the opposed side edges of said strip and spaced apart a distance slightly less than the normal over-all width of the strip, said holding member being formed of resilient material whereby said projecting portions may be spread apart sufficiently to permit the strip to be inserted therebetween and whereby the inherent resiliency thereof will cause the holding member to be yieldably and slidably held on the strip, and means removably mounted on said strip and connected with said stand for supporting a source of illumination in substantial alignment with said optical elements supported by the holding member, said means comprising a supporting bracket shaped to be inserted within the curve of one end of the strip between said strip and stand and having a portion shaped to interfit with a portion of the stand.

7. An optical bench of the character described comprising an elongated bed formed of a strip of resilient sheet material transversely cupped throughout the length thereof, stands for supporting the strip, each stand having a pair of integral upwardly disposed projections thereon located in spaced relation with one another a distance apart less than the distance between the side edges of the strip and a notched shelf-like portion adjacent the inner side edges of each of said projections, said strip being adapted to be forcibly detachably positioned and frictionally retained between said side edges of the projections with its longitudinal edges in seated relation with said shelf-like portions of said stands, and holding devices for supporting associated elements on said strip, said holding devices having integral depending projecting portions each provided with a slightly inwardly directed lip part at the extremities thereof, said projecting portions being spaced apart a distance less than the distance between the side edges of the strip and shaped to straddle and frictionally grip the opposed side edges of said strip when the lip parts thereof are forcibly snapped over said side edges of the strip and being frictionally movable longitudinally of said strip for adjustment of the elements carried thereby.

8. An optical bench of the character described comprised of a bed formed of an elongated strip of relatively thin resilient metallic material having an arcuate cross-sectional shape whereby the sides of said strip may be compressed to cause the strip to assume a smaller than normal over-all width and the inherent resiliency thereof will tend to cause the strip to resume its normal size and shape, stands for supporting the strip and having a pair of integral projections thereon located in spaced relation with one another which spacing is slightly less than the normal distance between the sides of the strip whereby said strip may be positioned and frictionally held therebetween, and holding devices for supporting optical elements on said strip, said holding devices having spaced integral depending projecting portions shaped to straddle and frictionally grip the opposed side edges of said strip and adapted to be frictionally moved longitudinally thereof for adjustment of the optical elements carried thereby.

References Cited in the file of this patent

UNITED STATES PATENTS

| | | |
|---|---|---|
| 783,125 | Moore | Feb. 21, 1905 |
| 1,633,190 | Rader | June 21, 1927 |
| 2,597,168 | North | May 20, 1952 |

FOREIGN PATENTS

| | | |
|---|---|---|
| 614,637 | Great Britain | Dec. 20, 1948 |
| 655,856 | Great Britain | Aug. 1, 1951 |
| 662,762 | Great Britain | Dec. 12, 1951 |